United States Patent [19]

Dykes et al.

[11] 4,100,571
[45] Jul. 11, 1978

[54] 360° NON-PROGRAMMED VISUAL SYSTEM

[75] Inventors: Wiley V. Dykes, Winter Park; Frank J. Oharek, Orlando, both of Fla.

[73] Assignee: The United States of America as represented by the Secretary of the Navy, Washington, D.C.

[21] Appl. No.: 765,170

[22] Filed: Feb. 3, 1977

[51] Int. Cl.² ............................................. H04N 7/18
[52] U.S. Cl. ..................................... 358/87; 35/12 N; 358/104
[58] Field of Search ........................ 358/87, 104, 237; 35/12 N

[56] References Cited

U.S. PATENT DOCUMENTS

| 3,275,743 | 9/1966 | Conant | 358/87 |
| 3,346,692 | 10/1967 | Carfield | 358/264 |
| 3,458,651 | 7/1969 | Dryden | 358/87 |

Primary Examiner—Howard W. Britton
Attorney, Agent, or Firm—Richard S. Sciascia; Don D. Doty

[57] ABSTRACT

A system is disclosed for displaying a life or other size replica of a modelboard or other scene in a non-programmed and real or other time manner, whereby said displayed replica constitutes a realistic ambient environmental simulation which may be used to facilitate the training of people in various and sundry situations, such as, for example, in piloting aircraft, tanks, automobiles, and other automotive devices, and the like. As disclosed, a modelboard scene is optically observed by a unique annular probe which forms an annular optical image thereof, rotates said annular optical image, and then timely converts it to a plurality of electrical signals proportional thereto. Suitable telemetering apparatus and timing circuits effect the transfer of said plurality of electrical signals to a unique annular projector which, in turn, reconstructs said converted annular optical image therefrom by means of lasers and laser light modulators, rotates it at a speed and in a direction that is equal and opposite to that mentioned above, and projects it onto the inner reflective surface of a substantially spherical or other wide angle screen as a displayed replica of the aforesaid modelboard scene, where it may be seen by the aforesaid people when they are located in proper proximity therewith.

25 Claims, 9 Drawing Figures

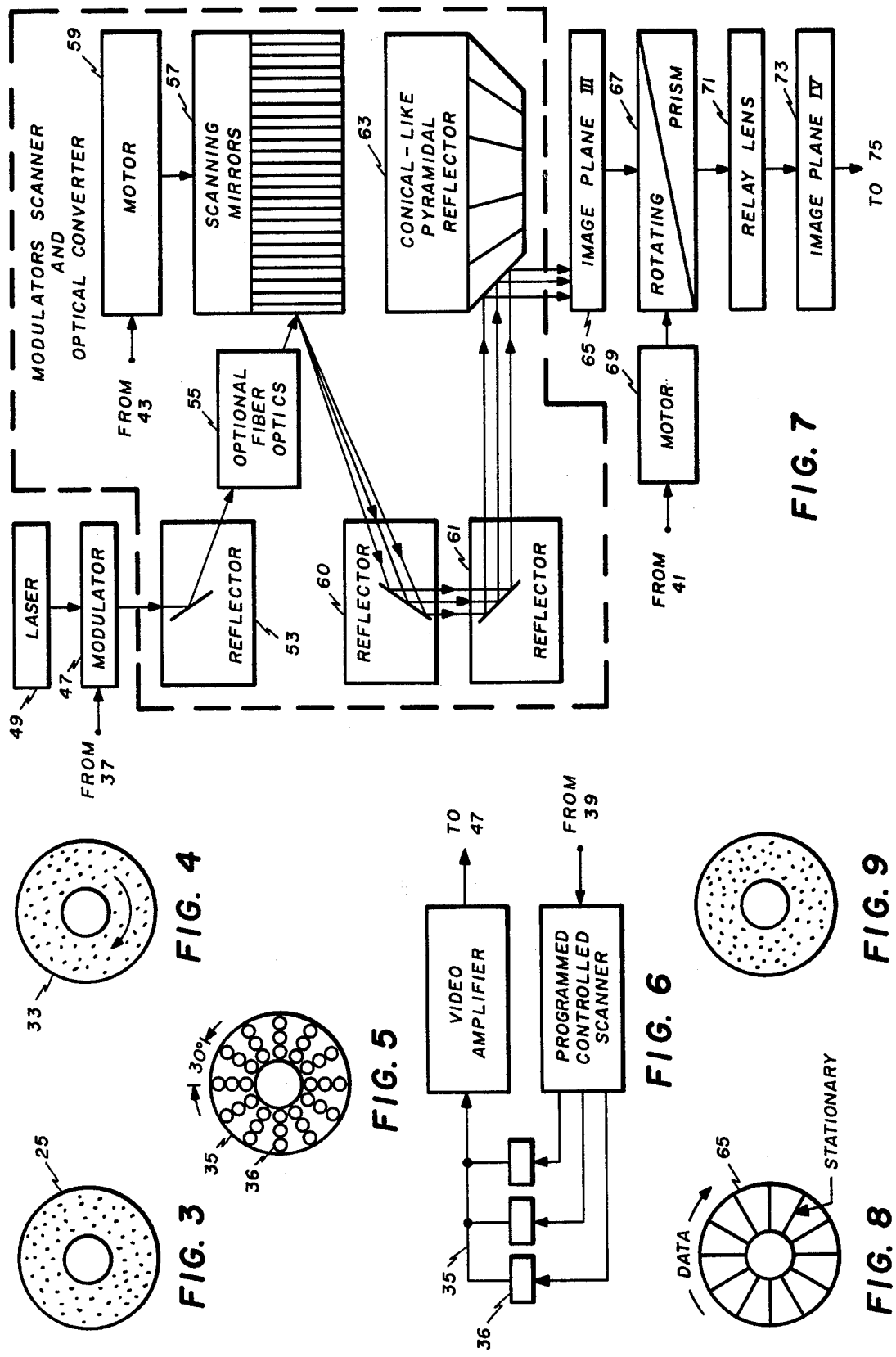

360° NON-PROGRAMMED VISUAL SYSTEM

FIELD OF THE INVENTION

The present invention, in general, relates to closed circuit television type simulation devices and, in particular, is a panoramic display simulator that may be incorporated to an advantage in various and sundry training devices. In even greater particularity, it is a non-programmed, real time, wide-360°-angle, high resolution, visual display system that effects the display of scenes obtained from a scaled, relatively miniature, modelboard as scenes which are monochromatic, life-size, and which have high resolution and fidelity, as well as provide maximum realism to an observer.

DESCRIPTION OF THE PRIOR ART

Heretofore, other wide angle, non-programmed visual displays have been made. For example, the known prior art includes closed circuit television systems which obtain and transfer images obtained from scaled modelboards to a projection screen, the latter of which may be placed in front of an aircraft cockpit mockup for pilot training purposes. Unfortunately, although useful in some situations, such system leaves something to be desired because the limited number of resolution elements in a single closed circuit television channel can only be spread over a relatively narrow field of view angle of about 60° and still maintain sufficient resolution in the displayed image to be useful for training purposes. Of course, solution to the aforementioned resolution problem might be to use multiple closed circuit television channels and then form a mosaic of 60° projectors, thereby achieving improved image resolution over a wider display angle. But, the problems in using such approach are seam matching, contrast or color matching, and brightness matching, to all of which the human eye is extremely sensitive; and in the event one or more thereof is mismatched, distorted images are viewed thereby.

SUMMARY OF THE INVENTION

The instant invention overcomes some of the disadvantages of the prior art, in that it includes a new combination of elements which does not have the matching problems mentioned above and, in addition, which prevents the occurrence of other distortions, as well. For instance, it is a 360°, unprogrammed, real time, visual display system which contains, among other things, an annular probe that scans a model of that scenery located on a modelboard which is desired to be displayed as a simulated real life situation for training or other purposes. Included within said probe are lenses, a motor driven rotating prism, and a photo diode array, which, in effect, converts scanned optical images into electrical signals proportional thereto.

An annular projector is also included in the subject invention. It contains a laser, an electro-optical modulator, optional fiber optics, motor driven scanning mirrors, a prism that rotates in a direction that is opposite that of the rotating prism of the aforesaid annular probe, and lenses.

Image transfer circuits, including a video amplifier and a programmed timer containing a master clock generator and frequency dividers, interconnect the aforementioned annular probe and annular projector, so as to effectively and timely transfer the electrical signals corresponding to the model observed by said annular probe to said annular projector for projection thereof thereby as optical signals to a predetermined viewing screen in real time.

Of course, any suitable structure may be employed to support the aforesaid annular probe and annular projector and their associated apparatus, and if so desired, motion generators — synchronized or not — may be used to give a more realistic experience to any person or persons being trained by the system incorporating the instant invention.

Therefore, an object of this invention is to provide an improved closed circuit television system.

Another object of this invention is to provide an improved wide angle visual display system.

Still another object of this invention is to provide an improved method and means of projecting the life-like, wide angle scene on a 360° screen which is a replica of a scene that was probed from a relatively miniature model thereof.

Another object of this invention is to provide an improved method and means which facilitates training pilots of various and sundry vehicles — especially aircrafts — in an economically produced, time saving, safe, highly realistic simulated environment without using real versions of said vehicles in real environments.

Another object of this invention is to provide a single closed circuit television system having a high number of resolution elements, thereby giving improved readout resolution over wide azimuth angles, including 360° azimuth angles by 90° elevational angles.

Another object of this invention is to provide an improved multi-laser television projector which produces high resolution displays with increased brightness.

Another object of this invention is to provide an improved annular probe — annular projector combination which may be used to an advantage in numerous compatible training devices and systems requiring unprogrammed, real-time, undistorted displays which simulate various real-life ambient environmental situations.

Other objects and many of the attendant advantages of this invention will be readily appreciated as the same becomes better understood by reference to the following detailed description when considered in connection with the accompanying drawing wherein:

BRIEF DESCRIPTION OF THE DRAWING

FIGS. 3 and 4 are schematic representations of disclike image planes I and II of the system of FIG. 1;

FIG. 5 is a bottom view of an abbreviated version of the sequentially scanned radially aligned photodetector arrays of FIG. 1;

FIG. 6 is a block diagram of the abbreviated photodetector array of FIG. 5 and the video amplifier and programmed scanner controller functionally associated therewith;

FIG. 7 is a more detailed block diagram of the modulators scanner and optical converter of the system of FIG. 1, along with some of the elements associated therewith; and FIGS. 8 and 9 respectively illustrate typical disc-like images which would occur at the third and fourth image planes of the system of FIG. 1 during the operation thereof.

DESCRIPTION OF THE PREFERRED EMBODIMENT

Figure 1:
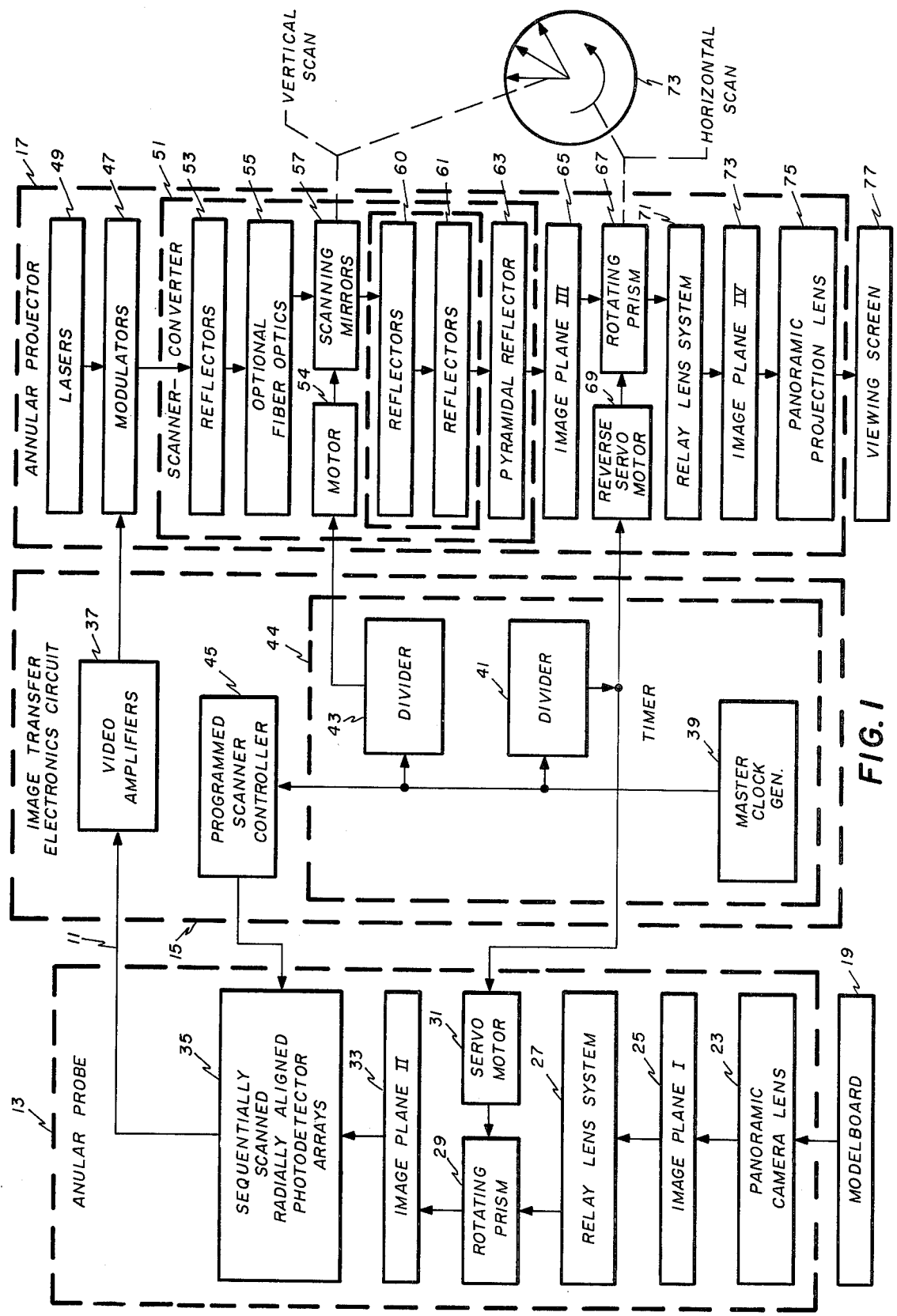
FIG. 1 is a block diagram of the wide angle closed circuit television display system constituting this invention.
Figure 2:
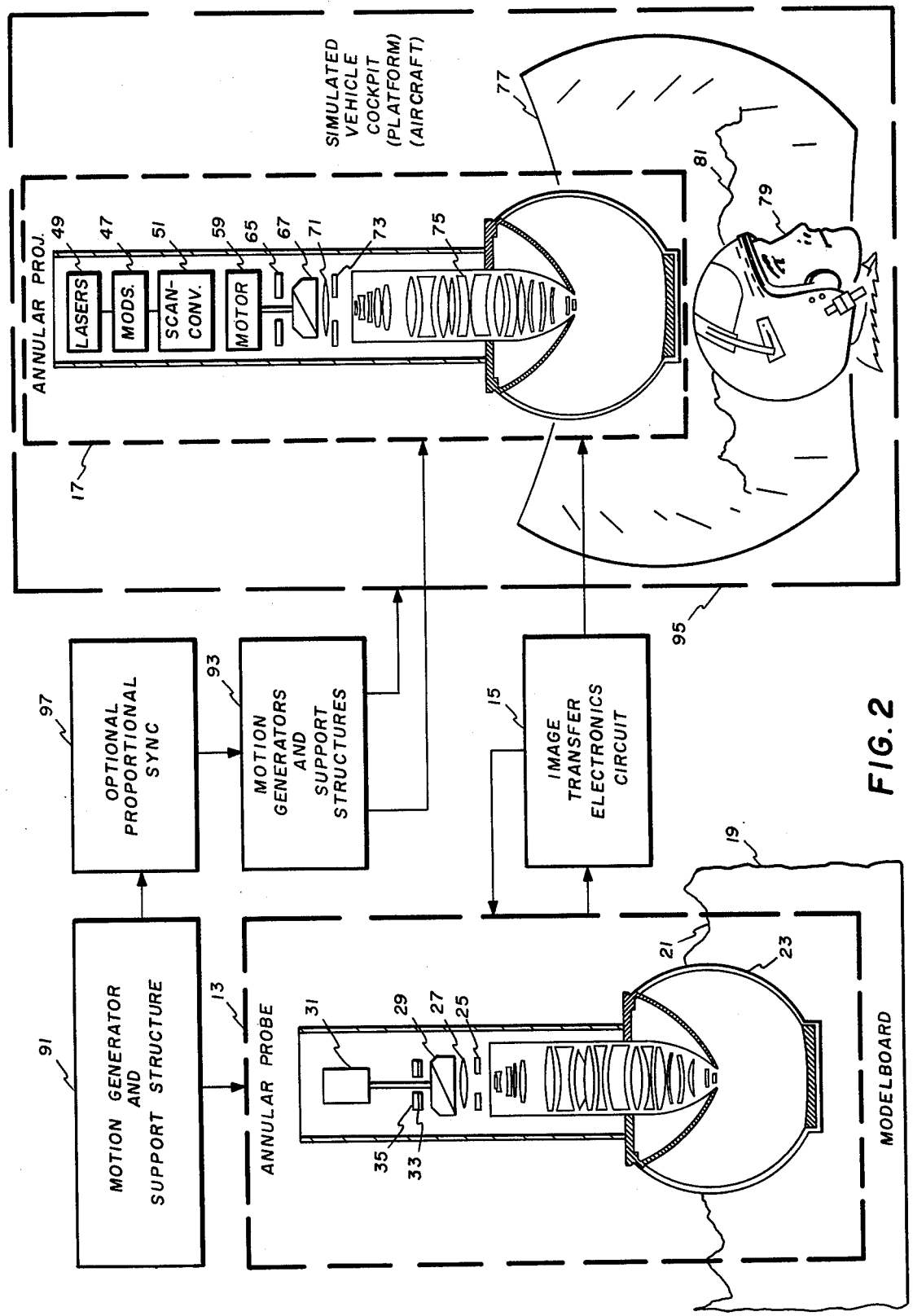
FIG. 2 is an elevational schematic view of the system of FIG. 1, illustrating primarily the annular probe and annular projector arrangements incorporated therein.

Referring now to FIGS. 1, 2, and 3, wherein like elements will be designated, as appropriate, by like reference numerals, the improved closed circuit television type system 11 constituting the subject invention is disclosed as containing an annular probe 13 (having an effective physical axis of revolution) effectively connected via an image transfer electronics circuit 15 to an annular projector 17 (having an effective physical axis of revolution, too).

In this particular instance, but not by way of limitation, annular probe 13 is an optical probe which observes or views a modelboard 19 upon which the scene 21 to be displayed in life or other size is constructed in miniature and ultimately generates electrical signals which are proportional to the viedo equivalent of the image provided thereby while probing a panoramic field of view thereon of the order of, say, for example, 360° in the horizontal plane by 90° in the vertical plane. So doing is accomplished by means of a panoramic camera lens 23 which transforms said 360° by 90°, three-dimensionally viewed model image into a flat annular disc-like image that is focused at a predetermined first image plane 25 (see FIG. 3) located on the axis of probe 13, with the spatial disposition thereof along said axis being contingent upon the particular selection which was made for panoramic lens 23. Hence, it would perhaps be noteworthy that panoramic camera lens 23 may be selected from a number of suitable, commercially available lens; nevertheless, the panoramic camera lens disclosed in U.S. Pat. No. 4,012,126 of Gottfried R. Rosendahl and Wiley V. Dykes for Optical System for 360° Annular Image Transfer, filed Apr. 8, 1974, has been found to be eminently satisfactory for such purpose.

At this time, it would also appear to be noteworthy that panoramic camera lens 23 represents (in flat picture form) the modelboard scene it is viewing in a rather distorted manner at first image plane 25 because it incorporates a convex mirror therein as one of the working components thereof; however, the distortions effected thereby are, for all practical purposes, optically corrected subsequently as a result of their being projected back through a substantially identical optical system and on to a spherical screen which is then viewed by an observer whose eyes are located as near the exit pupil of the projection lens as is practically possible, as will be discussed more fully below.

A relay lens system 27 is disposed in such position relative to image plane 25 as to be focused thereon, and a rotating prism 29 — which may be, for example, a conventional dove or Pechan prism — converts the image or picture existing in first image plane 25 at any given instant into an annularly configured rotating image or picture (see FIG. 4) as a consequence of being driven at a predetermined speed and in a predetermined direction by a servo motor 31. Of course, the aforesaid image is focused at a second image plane 33 that is ordinarily located in contiguous disposition with a plurality of photodetectors 35 which, for example, in this particular preferred embodiment of the invention, comprises 12 linear arrays or sets of sequentially scanned photodiodes, with each linear set thereof containing 1728 in-line photodiodes, with each linear set thereof disposed radially, and with the 12 sets thereof disposed at 30° intervals around the 360° field of view of the annular image of second image plane 33, respectively.

FIG. 5 discloses the general idea of the preferred disposition pattern of said photodiodes, although only three in-line photodiodes 37 are disclosed as being in each of the 12 sets or arrays thereof instead of 1728, in order to keep the disclosure thereof as simple as possible. Obviously, the number of photodiodes may be varied to suit any particular operational circumstance; therefore, it would be well within the purview of one skilled in the art having the benefit of the teachings presented herewith to select whatever number of photodiodes and whatever pattern thereof as would optimize the subject invention for any particular purpose.

Moreover, it would ostensively be noteworthy at this time that the aforementioned photodiodes are, in fact, electro-optical sensors which may be of any appropriate conventional type, such as charged coupled semi-conductive devices (CCDS), which are enabled in response to a predetermined electrical signal being supplied thereto and are disabled in response to an absence of said predetermined electrical signal. Such devices are discussed in Scientific American magazine, Vol. 230, No. 2, dated February 1974, at pages 22 through 31, and elsewhere and, thus, are well known and conventional per se.

As previously suggested, sequentially scanned radially aligned photodetector arrays 35 are in whatever contiguous disposition with second image plane 33 as would make them optically responsive in an optimum manner to the annular image that is rotating past them at said second image plane 33 at any given instant as a result of the timely rotation of prism 29.

The aforesaid image transfer electronics circuit 15 includes, among other things, a plurality of video amplifiers 38 which are respectively connected to the outputs of the plurality of sets of photodiodes incorporated in sequentially scanned radially aligned photodetector arrays 35. In this particular case, since 12 sets of photodiodes are employed therein, 12 video amplifiers are connected to the outputs thereof, respectively.

Also included in image transfer electronics circuit 15 is a master clock generator 39, the output of which is connected to the inputs of a first signal frequency divider 41, a second signal frequency divider 43 (in combination forming a timer 44), and a programmed scan controller 45, the latter of which may be any conventional electronic or electro-mechanical scanning device which would effect the timely enabling of the aforesaid lines and sets of photodiodes as a result of timely supplying enabling signals thereto. Although any desired program may be used therein, it is preferred that the 1728 or so photodiodes of each radially disposed linear set be enabled or scanned successively from, say, the inside radius to the outside radius and that all 12 sets be so scanned simultaneously, such as, for example, that photodiodes 1, 2, and so forth, of each set will be scanned at the same time photodiodes 1, 2, and so forth, of the others. In other words, all of the first, second, third, etc., photodiodes are enabled or scanned at the same time and, thus, 12 continuous output signals are produced at the same time by sequentially scanned radially aligned photodetector arrays 35 as a result of such programming by programmed scanner controller 45.

Because servo motor 31 must be run at a certain number of revolutions per minute in a given direction — so as to cause rotating prism 29 to do likewise — divider 41 is frequency designed to effect such performance and has its output connected to the speed control input thereof.

Since video amplifiers 37, in this case, comprise 12 amplifiers, the 12 outputs therefrom are respectively connected to 12 laser beam modulators 47 located in radial disposition around the axis of annular projector 17. Although any conventional laser beam modulators that are compatible with the subject system may be used therein, it has been found that the Model 3050 E.O. Modulators described on page 6 of the sales catalog of Coherent Radiation, Inc., Danbury, Conn., work quite well for such purpose. Of course, as may readily be inferred, a like plurality, viz., 12, lasers 49 are disposed in such manner with respect to said 12 modulators 47 that the laser beams emanating therefrom are modulated thereby, respectively, in accordance with the signals supplied to said modulators 47 by the aforesaid video amplifiers 37. Hence, it may readily be seen that the output of modulators 47 is a modulated optical beam and, furthermore, that all of the modulated optical beams thereof are supplied to their respective inputs at a scanner-converter 51, which, in this particular case, includes, among other things, 12 reflectors 53.

Referring to FIG. 7 for a moment, there is disclosed a more detailed diagram of a single set of the modulators scanner and optical converter 51 and some of the components operationally associated therewith. The reference numerals used therein will be the same as those used for like parts in FIGS. 1 and 2, so that they may be more easily cross-correlated; however, it should be understood that there are sometimes 12 of such components (disposed around the axis of projector 17) and sometimes one of such components (located on the axis of projector 17) depicted in both FIGS. 1 and 7 which have the same reference numeral for the aforesaid cross-correlation convenience.

Thus, scanner-converter 51 will now be discussed with reference to both FIG. 1 and FIG. 7, with the emphasis being put on FIG. 7 because the structure disclosed therein is illustrated in greater detail. Therefore, for each of the aforesaid channels or sets, the modulated laser beam output of modulator 47 is reflected by a suitably disposed reflector 53, which then reflects it toward optional fiber optics 55. Although reflector 53 may be position adjustable if so desired, so that the beam reflected therefrom will travel in the right direction, if fiber optics is used, greater latitude is given with respect to the positions of each of the aforesaid 12 channels or sets with respect to a plurality of scanning mirrors 57 which is an element that is associated in common with all thereof simultaneously. Hence, as may readily be seen from FIG. 7, fiber optics 55 may be used as the transportation means of the modulated laser beam reflected from reflector 53, even along some circuitous route toward a more conveniently disposed plurality of scanning mirrors 57.

The number of mirrors in scanning mirrors 57 may, of course, be varied as desired; however, it has been found that it is preferable to construct them in accordance with the following design formula:

$$N = nS,  \quad (1)$$

where $N$ = the number of mirrors disposed about the axis of revolution of projector 17, about which they are to revolve, $n$ = any whole number, $S$ = the number of linear optical sets or channels incorporated in annular probe 13 and annular projector 17.

Thus, it may readily be seen that if 12 optical sets or channels are incorporated in the instant invention, 12, 24, 36, and so forth, mirrors may be included in scanning mirrors 57, in which cases, $n$ would equal one, two, three, and so forth, respectively. Of course, the number of mirrors used would probably be selected in accordance with the image resolution desired for any given operational circumstance.

Scanning mirrors 57 are rotated at a predetermined speed about their axis of revolution by a servo motor 59, the speed control input of which is connected to the output of the aforesaid divider 43 of timer 44.

As best seen in FIG. 7, the modulated laser beam from fiber optics 55 is timely reflected from its respective mirror of scanning mirrors 57, and, thus, it travels toward a reflector 60, from which it is reflected toward a reflector 61, from which it is reflected toward a conical-like pyramidal reflector 63 (likewise located on the axis of probe 17), from which it is reflected toward a third image plane 65, as a result of being optically converted by the aforesaid optical elements.

As best seen in FIG. 8, the 12 radial lines of the modulated laser beams from modulators 47 are optically imaged at third image plane 65; however, since the modulations thereof, in effect, contain essentially the rotating data of second image plane 33, the data at third image plane 65 is rotating, too. Thus, although the radial lines of outputs from modulators 47 appear to be stationary in the representation thereof depicted in FIG. 8, the optical image data contained therein is rotating clockwise, as it was in FIG. 4. Of course, said clockwise rotating data of third image plane 65 represents the aforesaid scene probed from modelboard 19, even though at this point it would not be distinguishable to an observer.

Another Dove or Pechan prism (or any other appropriate substitute therefor) 67 is rotated at some predetermined optical distance from image plane 65 by a reverse direction — that is, reverse direction compared to servo motor 31 of annular probe 13 — servo motor 69, the speed control input of which is connected to the output of the aforesaid divider 41 of timer 44. Hence, a de-rotated version of image plane 65 is supplied to a relay lens system 71 which, in turn, forms a usable stationary optical image at a fourth image plane 73. As best seen in FIG. 1, a representation (in disc form as well as in block diagram form) of the aforesaid fourth image plane is portrayed and referenced by numeral 73. The disc-form portrayal thereof has been included to show that the horizontal scan thereof is located around the disc as shown by the curved arrow thereon, while the vertical scan thereof is implemented in the radial direction thereon. Of course, the disclosed disc-form is merely representative and obviously the scan directions may be the opposite of that shown, if so desired. It is this de-rotated optical image that is supplied to a panoramic projection lens 75 (which is substantially identical to the aforesaid panoramic camera lens 23 of annular probe 13) that, in turn, projects it toward a substantially spherical display screen 77, where an observer 79 (human or instrumental) may view it as a typical 360° by 90°, life or other size, pictorial representation 81 of the scene 21 probed from modelboard 19 by annular probe 13. Of course, the scene projected on screen 77 simulates whatever ambient environment is needed to provide observer 79 with an optimum experience for training or other purposes. And if observer 79 happens to be an aircraft pilot, tank pilot, ship pilot, or the like, the feeling of realism engendered therein by such simulated environmental scene 81 certainly facilitates the training thereof. Accordingly, it may readily be seen that the subject invention has utility in many training, entertainment, and other situations.

At this time, it would ostensively be noteworthy that all of the aforementioned elements and components are physically disposed in such manner with respect to each other — and, as appropriate, either on or about the axes of annular probe 13 and annular projector 17, respectively — that the respective timing, mechanical, electrical, and optical functions performed thereby — both individually and in concert — occur in an optimum manner. Of course, the particular dimensions, distances, configurations, etc., employed would be contingent upon the sizes, shapes, resolutions, etc., which are required therefor by any given operational situation. The making of the proper selections therefor, being matters of design choice, would obviously be well within the purview of one skilled in the art having the benefit of the teachings presented herewith, especially since all of the elements and components used in the invention are well known and conventional in and of themselves, and since it is the new combination of such old elements which, in fact, constitutes it. Accordingly, such design details are not deemed to be necessary, as far as the disclosure of this invention is concerned.

As best seen in FIG. 2, any motion generator and support structure 91 may be connected to annular probe 13 that will permit it to be held in the desired positions with respect to modelboard 19. Also, any motion generators and support structures 93 may be connected to annular projector 17 that will permit it to be held in the desired positions with respect to a simulated vehicle cockpit, platform, or the like, 95. In addition, an optional proportional synchronization device 97 may be connected between motion generator and support structure 91 and motion generators and support structures 93, so that any desired relative motion therebetween may be timely effected in whatever proportions as would be most useful during any given operational situation. Of course, movement of the aforementioned support structures would cause movement of the aforesaid annular probe, annular projector, and simulated vehicle cockpit, too.

MODE OF OPERATION

The operation of the invention will now be discussed briefly in conjunction with all of the figures of the drawing.

As best seen in FIGS. 1 and 2, whatever image or scene 21 as is constructed on modelboard 19 is probed by annular probe 13. The three-dimensional 360° by 90° view of the model is probed as a result of its being observed by panoramic camera lens 23, which converts the three-dimensional structure thereof to a flat, annular disc-like, two-dimensional, stationary picture thereof that is focused at first image plane 25 (see FIG. 3). Then relay lens 27 transmits the picture of image plane 25 to rotating prism 29 where it is rotated thereby, say, in a clockwise direction, and again focused at second image plane 33 as a rotating disc-like picture, similar to that depicted in FIG. 4. It is this picture or image that is exposed constantly to the 12 radial lines of CCDS of sequentially scanned or sampled radially aligned photodetector arrays 35; however, only portions thereof are scanned at any given instant because, as previously mentioned, all of first circle of CCDS are enabled at one time, then the second circle of CCDS are enabled a very short time thereafter, and so on and so forth, unitl the 1728 CCDS have been timely enabled. In such case, the image or picture located at second image plane 33 is effectively scanned from a predetermined inner radius to some predetermined outer radius (or vice versa, if desired) in accordance with the timing program effected by programmed scan controller 45 and master clock generator 39. Of course, should some particular operational circumstances so warrant, any other photodetector scanning procedure may be employed. Nevertheless, as described above, sequentially scanned radially aligned photodetector arrays 35 (see FIG. 6 for three representative CCDS) produce 12 continuous electrical signals, each of which represent successively scanned radially aligned CCDS in the amount of, say, for example, 1728.

After being amplified to more useful levels by video amplifier 37, said 12 electrical signals are supplied to 12 modulators 47, where they act as the modulation control signals therefor. Thus, modulators 47 modulate the constantly received laser beams emanating from lasers 49 in accordance with said 12 modulation control signals, respectively. And after being optimumly directed by suitable reflectors 53 — and perhaps by optical fibers 55 — said 12 modulated laser beams are scanned by rotating scanning mirrors 57, the rotation of which is properly timed by servo motor 59, divider 43, and master clock generator 39, and thereby synchronized with programmed scan controller 45 and photodetector arrays 35, so as to cause the optical equivalents of said successively scanned 1728 CCDS to be successively reflected toward reflectors 59, then toward reflectors 61, and then toward faceted conical reflector 63 which, in turn, focuses them as a stationary picture or image at third image plane 65 in flat annular disc-like form, as represented schematically by FIG. 8. The image of third image plane 65 is then de-rotated — that is, rotated in a direction that is opposite the rotation of the aforesaid rotating prism 29 — as a consequence of rotating prism 67 being driven by reverse servo motor 69 which, like motor 31, is speed controlled by divider 41, so that the rotational speeds of prisms 29 and 69 are equal but opposite.

At this time, for purposes of emphasis, it should again be noted that prism 67 and prism 29 are oppositely rotated prisms, and that such opposite rotations thereof constitute important functions within the subject invention which makes its improved overall performance possible.

Again, a relay lens system 71, similar to relay lens 27 of annular probe 13, transmits the picture from rotating prism 67 to another focal plane herewith defined as being fourth image plane 73. Then another panoramic lens 75, substantially identical to panoramic camera lens 23 of annular probe 13, projects the image of fourth image plane 75 on the inside surface of a 360° by 90°, substantially spherical viewing screen 77, as best seen in FIG. 2.

As previously indicated, because panoramic lenses 23 and 75 are substantially identical, the image errors caused by the former are automatically corrected by the latter, and, thus, the picture projected on viewing screen 77 is a life-like, high-resolution, monochromatic picture of the view of modelboard 19 being probed at any given instant.

Also, as previously suggested, because annular probe 13 and annular projector 17, as well as simulated vehicle cockpit 95, are respectively supported by movable support structures optionally actuated by suitable motion generators, such as, for instance, by means of motion generators and support structures 91 and 93 (see FIG. 2), either one or all thereof may be given whatever movement as will cause them to give observer 79 a realistic impression, even though he is in a simulator and, thus, artificial visual environment. Furthermore, in the event motion generators and support structures 91 and 93 require movement synchronization therebetween during any given operational simulation, they may be synchronized, too, by means of any appropriate conventional proportional synchronization device 97 as, likewise, previously indicated. Of course, the relative movement proportion employed thereby may be one-to-one or any other proportion, as desired by the artisan.

From the foregoing, it may readily be seen that a miniature modelboard scene may be transferred to a simulated vehicle cockpit or platform, such as, for instance, a simulated aircraft, tank, ship, or other cockpit, and that so doing would facilitate the training of a pilot or other observer. And because the present invention causes such situation to occur in an exceedingly realistic manner, it constitutes an improvement in the closed circuit television and training simulation arts. Of course, as a general rule, the aforementioned annular probe 13, image transfer electronic circuit 15, and annular projector 17 are in sufficiently close proximity to each other to warrant the respective interconnections therebetween being made by appropriately selected electrical wires or other electrical conductors; nevertheless, in the event said items are remotely disposed from one another, it may be desirable to interconnect them by means of some suitable telemetering apparatus, the selection of which would obviously be well within the purview of the artisan having the benefit of the teachings presented herewith.

Although the preferred embodiment of the invention discussed above is a monochromatic version thereof, if so desired, as an alternative, it may be converted into a color embodiment of the invention merely by substituting the proper color lasers for lasers 49, respectively, and inserting a conventional color coordinated filter — that is, one that will properly pass each of the radiation frequencies of the color lasers used — between the output of rotating prism 29 and the respective CCDS of sequentially scanned radially aligned photodetector arrays 35. For example, if lasers 49 were all argon lasers (which inherently produce two-color laser radiation beams) in the aforementioned embodiment of the invention, only every third one thereof would have to be replaced with, say, a krypton laser, in order to provide the needed color frequencies to produce a natural color picture on screen 77. Of course, as suggested above, the color passing frequencies of said filter would have to be coordinated with the radially aligned CCDS of photodetector arrays 35 which are effectively associated with like color lasers of lasers 49 by means of modulators 47, respectively.

Obviously many modifications and variations of the present invention are possible in the light of the above teachings. It is, therefore, to be understood that within the scope of the appended claims the invention may be practiced otherwise than as specifically described.

What is claimed is:

1. A system for optically simulating a predetermined life-size environmental image obtained from a model thereof, comprising in combination:
    means for observing the aforesaid model to be optically simulated in predetermined life-size and for producing a stationary first annular optical image thereof at a first annular image plane;
    means spatially disposed from said model observing means for rotating the stationary first annular optical image produced thereby at a predetermined speed and in a predetermined rotational direction, so as to produce a rotating second annular optical image of the aforesaid model as a second annular image plane;
    means spatially disposed from said rotating second annular optical image producing means for effectively scanning the rotating second annular optical image produced thereby in such manner as to generate a plurality of continuous electrical signals proportional thereto;
    means effectively connected to the output of said scanning means for reconstructing said rotating second annular optical image as rotating third annular optical image data representing the aforesaid model at a third annular optical image plane in response to said plurality of continuous electrical signals;
    means spatially disposed from said reconstructing means for rotating the rotating third annular optical image data produced thereby at a speed equal to the speed of rotation of said second annular optical image and with a rotational direction opposite thereto, so as to produce a stationary fourth annular optical image of the aforesaid model at a fourth annular image plane;
    reflective display means; and
    means spatially disposed from said stationary fourth annular optical image producing means for receiving the stationary fourth annular optical image produced thereby at said fourth annular image plane and for effecting the projection thereof on the aforesaid reflective display means.

2. The system of claim 1, further characterized by a programmed timer means connected to the control input of said first annular optical image rotating means and to the control input of the aforesaid third annular optical image data rotating means for controlling the speeds and directions thereof, respectively, whereby the speeds thereof are identical and the directions of rotation thereof are opposite.

3. The system of claim 1, wherein said means spatially disposed from said rotating second annular optical image producing means for effectively scanning the rotating second annular optical image produced thereby in such manner as to generate a plurality of continuous electrical signals proportional thereto comprises:
    a plurality of photodetectors;
    controller means connected to said plurality of photodetectors for timely effecting the enabling thereof, respectively, in accordance with a predetermined scanning program; and
    a master clock generator connected to said controller means for supplying a predetermined reference control signal thereto.

4. The system of claim 1, wherein said means spatially disposed from said rotating second annular optical image producing means for effectively scanning the rotating second annular optical image produced thereby in such manner as to generate a plurality of continuous electrical signals proportional thereto comprises:

a plurality of sequentially scanned radially aligned photodiode arrays, each array of which contains a predetermined plurality of photodiodes, each photodiode of which has a light sensitive input, an electrical control input, and an output, with the light sensitive input thereof disposed for timely sensing the light from said rotating second annular optical image of the aforesaid model located at said second annular image plane, and with the output thereof effectively connected to the input of the aforesaid reconstructing means;

a programmed scanner controller having an input and a plurality of outputs, with the plurality of the outputs thereof respectively connected to the electrical control inputs of said plurality of photodiodes; and a master clock generator means, with the output thereof connected to the input of said programmed scanner controller for supplying a predetermined frequency signal thereto.

5. The system of claim 1, wherein said means for observing the aforesaid model to be optically simulated in predetermined life-size and for producing a stationary first annular optical image thereof at a first annular image plane comprises a panoramic camera lens.

6. The system of claim 1, wherein said means spatially disposed from said model observing means for rotating the stationary first annular optical image produced thereby at a predetermined speed and in a predetermined rotational direction, so as to produce a rotating second annular optical image of the aforesaid model at a second image plane comprises:

a pechan prism; and a servo motor connected to said pechan prism in such manner as to effect the rotational driving thereof.

7. The system of claim 1, wherein said means spatially disposed from said reconstructing means for rotating the rotating third annular optical image data produced thereby at a speed equal to the speed of rotation of said second annular optical image and with a rotational direction opposite thereto, so as to produce a stationary fourth annular optical image of the aforesaid model at a fourth annular image plane comprises:

a pechan prism; and a servo motor connected to said pechan prism in such manner as to effect the rotational driving thereof in a direction that is opposite the direction of rotation of said rotating second annular optical image.

8. The system of claim 1, wherein said reflective display means comprises a substantially spherically configured viewing screen, with the center thereof contiguously disposed with the exit pupil of said projection effecting means.

9. The system of claim 1, wherein said means spatially disposed from said stationary fourth annular optical image producing means for receiving the stationary fourth annular optical image produced thereby at said fourth image plane and for effecting the projection thereof on the aforesaid reflective display means comprises a panoramic projection lens.

10. The system of claim 1, wherein said means effectively connected to the output of said scanning means for reconstructing said rotating second annular optical image as rotating third annular optical image data representing the aforesaid model at a third annular optical image plane in response to said plurality of continuous electrical signals comprises:

a plurality of lasers, each of which project a collimated laser light;

a like plurality of light modulators disposed in such manner with respect to said plurality of lasers as to modulate the laser lights therefrom, respectively, in response to the aforesaid plurality of continuous electrical signals; and a scanner-converter spatially disposed from said plurality of light modulators in such manner as to receive and scan the modulated laser lights therefrom, whereby the aforesaid rotating third annular optical image data representing the aforesaid model is reconstructed at said third annular image plane.

11. The system of claim 10, wherein said scanner-converter comprises:

a first plurality of reflectors for receiving the modulated laser lights from said modulators and redirecting them toward a predetermined imaginary point of convergence;

a plurality of scanning mirrors disposed in such circular configuration about the aforesaid point of convergence as to simultaneously reflect said modulated laser lights along a like plurality of radial paths therefrom, respectively;

a motor connected to said plurality of scanning mirrors for the driving thereof in a predetermined direction about an axis of rotation that passes through the aforesaid predetermined imaginary point of convergence;

a faceted conical reflector; and a plurality of reflectors spatially disposed from said faceted conical reflector in such manner as to receive and redirect the plurality of modulated laser lights therefrom.

12. The system of claim 1, further characterized by telemetering means connected between the output of said scanning means and the input of said reconstructing means for transferring the aforesaid continuous electrical signal therefrom thereto.

13. The system of claim 12, wherein said plurality of continuous electrical signals transferring means comprises a like plurality of video amplifiers.

14. The system of claim 12, wherein said plurality of continuous electrical signals transferring means comprises a like plurality of electrical wires.

15. A system for optically producing a life-size replica of a scene provided by a predetermined model thereof, comprising in combination:

panoramic camera lens means for observing the aforesaid model and for producing a flat stationary first annular optical image thereof at a first plane;

first rotatable prism means spatically disposed from said model observing means adapted for rotating the flat stationary first annular optical image produced thereby at a predetermined speed and in a predetermined rotational direction, so as to produce a flat rotating second annular optical image of the aforesaid model at a second plane;

first servo motor means connected to said first rotatable prism means for the driving thereof at the aforesaid predetermined speed and in said predetermined rotational direction;

first relay lens means spatially disposed between said panoramic camera lens means and said first rotatable prism means for relaying said flat stationary first annular optical image therefrom thereto;

a plurality of sequentially scanned, radially aligned, photodetector arrays spatially disposed from said first rotatable prism means for scanning the rotating second annular optical image produced thereby in such manner as to generate a like plurality of continuous electrical signals respectively proportional thereto;

means effectively connected to the output of said plurality of sequentially scanned, radially aligned, photodetector arrays for reconstructing said rotating second annular optical image as flat rotating third annular optical image date representing the aforesaid model at a third plane in response to said plurality of continuous electrical signals;

a second rotatable prism means that is substantially identical to the aforesaid first rotatable prism means spatially disposed from said reconstructing means and adapted for de-rotating the flat rotating third annular optical image data produced thereby at a speed that is equal to the speed of rotation of said second annular optical image and with a de-rotational direction that is opposite thereto;

second servo motor means connected to said second rotatable prism means for the driving thereof at the aforesaid speed and in said opposite rotational direction;

a relay lens means spatially disposed from said second rotatable prism means for relaying the flat rotating third annular optical image data produced thereby to a fourth plane as a flat stationary fourth annular optical image of the aforesaid model;

a viewing screen having a predetermined geometrical configuration; and a panoramic projection lens means spatially disposed from said relay lens means in such manner as to receive said flat stationary fourth optical image from said fourth plane and for the projecting thereof on said viewing screen as a life-size replica of the scene provided by the aforesaid predetermined model.

16. The system of claim 15, further characterized by:
means connected to said first and second servo motor means for controlling the speeds and directions of rotation thereof, respectively.

17. The system of claim 15, wherein each array of said plurality of sequentially scanned, radially aligned, photodetector arrays comprises a predetermined plurality of light sensitive photodiodes which are enabled in response to certain signals being supplied thereto and disabled in response to said certain signals not being supplied thereto, respectively.

18. The system of claim 17, further characterized by means connected to each of the light sensitive photodiodes of the arrays of the aforesaid sequentially scanned, radially aligned, photodetector arrays for timely supplying said certain enabling signals thereto in accordance with a controlled scanning program.

19. A system for displaying a life-size scene taken from a predetermined model thereof, comprising in combination:

a modelboard having a miniature model of the life-size scene to be displayed constructed thereon;

a panoramic camera lens spatially disposed from said modelboard and on a first predetermined optical axis;

a relay lens system spatially disposed from said panoramic camera lens and located on said first optical axis;

a first rotatable dove prism spatially disposed from said relay lens system and located on said first optical axis;

a first controllable servo motor connected to said rotatable dove prism for the driving thereof at a certain speed and with a predetermined direction of rotation;

a plurality of sequentially scanned, radially aligned, photodetector arrays spatially disposed from said rotatable dove prism and located along and around said first optical axis;

a plurality of video amplifiers respectively connected to the outputs of the arrays of said plurality of sequentially scanned, radially aligned, photodetector arrays;

a plurality of lasers disposed around a second optical axis;

a like plurality of laser light modulators spatially disposed from said plurality of lasers and along and around said second optical axis for modulating the laser lights therefrom in response to a like plurality of control input signals, respectively;

means connected between the outputs of said plurality of video amplifiers and the control inputs of said like plurality of laser light modulators for supplying said control input signals thereto, respectively;

a first like plurality of reflectors spatially disposed from said laser light modulators, respectively, and along and around said second optical axis;

a plurality of rotatable scanning mirrors spatially disposed from said first plurality of reflectors and along and around said second optical axis;

a second controllable servo motor connected to said rotatable scanning mirrors for the rotation thereof at a predetermined speed and with a given rotational direction;

a second plurality of reflectors spatially disposed from said plurality of rotatable scanning mirrors and along and around said second optical axis;

a faceted conical reflector spatially disposed from said second plurality of reflectors and along and around said second optical axis;

a second rotatable dove prism spatially disposed from said faceted conical reflector and located on said second optical axis, said second rotatable dove prism being substantially identical to the aforesaid first rotatable dove prism;

a third controllable servo motor connected to said second rotatable dove prism for the driving thereof at a speed that is identical to that of the aforesaid first rotatable dove prism and in a rotational direction that is opposite thereto;

a second relay lens system spatially disposed from said second rotatable dove prism and located on said second optical axis;

a panoramic projection lens having an exit pupil spatially disposed from said second relay lens system and located on said second optical axis;

a viewing screen of such curved geometrical configuration as to have a field of view of the order of 360° by 90° disposed around the exit pupil of the aforesaid panoramic projection lens and located along and around said second optical axis;

a master clock generator;

means connected between the output of said master clock generator and the control inputs of the aforesaid first, second, and third controllable servo motors for effectively regulating the speeds thereof, respectively; and a programmable scanner controller connected between the output of said master clock generator and the respective inputs of the aforesaid sequentially scanned, radially aligned, photodetector arrays.

20. The system of claim 19, further characterized by:

a first support structure connected to all of the elements located on, along, and around said first axis for the mounting thereof as an annular probe;

a second support structure connected to all of the elements located on, along, and around said second axis for the mounting thereof as an annular projector and a display screen, respectively.

21. The system of claim 20, further characterized by:

a first motion generator means connected to said first support structure for the timely movement thereof in accordance with a predetermined first motion program; and a second motion generator means connected to said second support structure for the timely movement thereof in accordance with a predetermined second motion program.

22. The system of claim 21, further characterized by means connected between said first and second motion generator means for synchronizing the motions thereof.

23. A method for displaying a miniature model scene as a life-size replica thereof, comprising the steps of:

probing said miniature model scene and forming an annular optical image thereof;

rotating said annular optical image of said probed miniature model scene at a predetermined speed and in a predetermined direction;

scanning the rotated annular optical image of said probed miniature model scene in such manner as to generate a plurality of electrical signals representative thereof;

reconstructing the scanned rotated annular optical image of said miniature model scene from said plurality of electrical signals;

rotating said reconstructed scanned rotated annular optical image of said miniature model scene at a speed and in a direction that is equal and opposite to that of the previous rotation of the aforesaid annular optical image of said probed miniature model scene; and projecting said rotated reconstructed optical image of said miniature model scene onto a predetermined viewing screen so as to display a life-size replica thereof.

24. A system for optically simulating a predetermined image obtained from a model thereof, comprising in combination:

means for observing the aforesaid model to be optically simulated and for producing a stationary first annular optical image thereof at a first annular image plane;

means spatially disposed from said model observing means for rotating the stationary first annular optical image produced thereby at a predetermined speed and in a predetermined rotational direction, so as to produce a rotating second annular optical image of the aforesaid model at a second annular image plane;

means spatially disposed from the aforesaid rotating means for sensing and transducing the rotating second annular optical image produced thereby at said second image plane into a plurality of electrical analog signals proportional thereto;

means connected to the outputs of said transducing means for receiving and transducing said plurality of electrical analog signals into a third rotating annular optical image at a third image plane that is similar to the aforesaid rotating second annular optical image;

means connected between the aforesaid sensing and transducing means and said receiving and transducing means for controlling the transductions respectively effected thereby in accordance with a predetermined program;

means spatially disposed from said receiving and transducing means for rotating the rotating third annular optical image produced thereby at a speed equal to the speed of rotation of said second annular optical image and with a rotational direction opposite thereto, so as to produce a stationary fourth annular optical image of the aforesaid model at a fourth annular image plane;

reflective display means; and means spatially disposed from said stationary fourth annular optical image producing means for receiving the stationary fourth annular optical image produced thereby at said fourth annular image plane and for effecting the projection thereof on the aforesaid reflective display means.

25. A system for optically simulating a predetermined image obtained from a model thereof, comprising in combination:

means for observing the aforesaid model to be optically simulated and for producing a stationary first annular optical image thereof at a first annular image plane;

means spatially disposed from said model observing means for rotating the stationary first annular optical image produced thereby at a predetermined speed and in a predetermined rotational direction, so as to produce a rotating second annular optical image of the aforesaid model at a second annular image plane;

a plurality of sequentially scanned radially aligned photodiode arrays spatially disposed from said rotating second annular optical image producing means, each array of which contains a predetermined plurality of photodiodes, each photodiode of which has a light sensitive input, an electrical control input, and an output, with the light sensitive input thereof disposed for timely sensing the light from said rotating second annular optical image of the aforesaid model located at said second annular image plane;

a programmed scanner-controller having an input and a plurality of outputs, with the plurality of outputs thereof respectively connected to the electrical control inputs of said plurality of photodiodes;

a plurality of lasers, each of which projects a collimated laser light;

a like plurality of light modulators effectively respectively connected to the outputs of the aforesaid plurality of photodiodes and spatially disposed in such manner with respect to said plurality of lasers as to modulate the laser lights therefrom, respectively;

a scanner-converter spatially disposed from said plurality of light modulators in such manner as to receive and scan the modulated laser lights therefrom, whereby a rotating third annular optical image representing the aforesaid model is reconstructed at a third annular image plane;

master clock generator means, with an output thereof connected to the input of said programmed scanner-controller for supplying a predetermined first frequency signal thereto, and with an output thereof effectively connected to an input of the aforesaid scanner-converter for supplying a predetermined second frequency signal thereto;

means spatially disposed from said scanner-converter for rotating the rotating third annular optical image produced thereby at a speed equal to the speed of rotation of said second annular optical image and with a rotational direction opposite thereto, so as to produce a stationary fourth annular optical image of the aforesaid model at a fourth annular image plane;

reflective display means; and means spatially disposed from said stationary fourth annular optical image producing means for receiving the stationary fourth annular optical image produced thereby at said fourth annular image plane and for effecting the projection thereof on the aforesaid reflective display means.

* * * * *